(12) United States Patent
Namiki (10) Patent No.: US 6,805,380 B2
(45) Date of Patent: Oct. 19, 2004

(54) VEHICULAR PASSIVE SAFETY DEVICE (75) Inventor: Hideo Namiki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/114,991

(22) Filed: Apr. 4, 2002

(65) Prior Publication Data

US 2002/0153715 A1 Oct. 24, 2002

(30) Foreign Application Priority Data

Apr. 18, 2001 (JP) ........................................ 2001-120234

(51) Int. Cl.$^7$ ............................................. B60R 22/00
(52) U.S. Cl. .................................................. 280/801.1
(58) Field of Search ............................. 280/801.1, 808, 280/730.2, 733; 297/468

(56) References Cited

U.S. PATENT DOCUMENTS

| | | | | |
|---|---|---|---|---|
| 3,841,654 A | * | 10/1974 | Lewis | 280/733 |
| 3,865,398 A | * | 2/1975 | Woll | 280/733 |
| 3,866,940 A | * | 2/1975 | Lewis | 280/733 |
| 3,888,503 A | * | 6/1975 | Hamilton | 280/733 |
| 3,970,329 A | * | 7/1976 | Lewis | 280/733 |
| 5,393,091 A | * | 2/1995 | Tanaka et al. | 280/733 |
| 5,465,999 A | * | 11/1995 | Tanaka et al. | 280/733 |
| 5,466,003 A | * | 11/1995 | Tanaka et al. | 280/733 |
| 5,947,513 A | * | 9/1999 | Lehto | 280/733 |
| 6,220,626 B1 | * | 4/2001 | Utsumi et al. | 280/733 |
| 6,237,945 B1 | * | 5/2001 | Aboud et al. | 280/733 |
| 6,276,715 B1 | * | 8/2001 | Takeuchi | 280/733 |
| 6,406,059 B1 | * | 6/2002 | Taubenberger et al. | 280/733 |

FOREIGN PATENT DOCUMENTS

| | | |
|---|---|---|
| DE | 298 11 734 U1 | 10/1998 |
| EP | 1 031 472 A2 | 8/2000 |
| GB | 2 341 358 A | 3/2000 |
| JP | 11-348720 A | 12/1999 |

* cited by examiner

*Primary Examiner*—Faye M. Fleming
(74) *Attorney, Agent, or Firm*—Birch, Stewart, Kolasch & Birch, LLP (57) ABSTRACT

To enable effectively binding the front, the head and the neck of an occupant in a vehicular passive safety device that binds the occupant by inflating the webbing. As an upper portion of an inflated portion of webbing of an air belt system is located in a position in which each side of the head H and the neck N of an occupant can be protected, it is needless to say that the front B of the occupant can be softly bound with the inflated portion in a head-on collision. The head H and the neck N of the occupant are softly bound in a side impact and the air belt system can also function as a side air bag system and an air curtain system. In addition, as the thickness of the portion to be inflated becomes thinner downwardly from the upper portion, the required capacity of an inflator can be reduced by reducing the volume of a lower portion of the inflated portion in which required binding force can be easily acquired even if the lower portion is thinned.

18 Claims, 6 Drawing Sheets

VEHICULAR PASSIVE SAFETY DEVICE

CROSS-REFERENCE TO RELATED APPLICATIONS

The present application claims priority under 35 USC 119 to Japanese Patent Application No. 2001-120234 filed on Apr. 18, 2001 the entire contents thereof is hereby incorporated by reference.

BACKGROUND OF THE INVENTION

1. Field of the Invention

The present invention relates to a passive safety device that inflates a portion of the webbing for binding an occupant on a seat with high pressure gas supplied from an inflator when a vehicle collides.

2. Description of Background Art

An air belt system for an automobile that houses a bag inside the webbing of a seat belt and softly binds an occupant by inflating the bag when a vehicle collides is disclosed in Japanese published unexamined patent application No. Hei 11-348720. For this air belt system, the volume when the bag is inflated is minimized by thickening the thickness when a shoulder belt for binding an occupant is inflated in an intermediate portion that comes in contact with the front of an occupant. In addition, the shoulder belt is thinner at the upper and lower ends that come in contact with the neck and the side so as to reduce the required capacity of the inflator.

The conventional type air belt system has a main object to bind the front of an occupant in a head-on collision of a vehicle. However, since the upper end of the bag is thin, it is difficult to effectively bind the head and the neck of an occupant in a side impact. Therefore, to protect the head and the neck of the occupant in a side impact, a side air bag system and an air curtain system are required to be provided in addition to the air belt system. However, when the side air bag system and the air curtain system are provided in addition to the air belt system, the cost is not only greatly increased but it may be difficult in a compact vehicle to secure the space for mounting the side air bag system and the air curtain system.

SUMMARY AND OBJECTS OF THE INVENTION

The present invention overcomes the above-mentioned disadvantages and it is an object of the present invention to enable effectively binding of the front, the head and the neck of an occupant in a vehicular passive safety device that binds the occupant by inflating the webbing.

To achieve this object, according to the present invention, a vehicular passive safety device is based upon a vehicular passive safety device that inflates a portion of the webbing diagonally arranged on the front portion of an occupant to bind the occupant on a seat with a high pressure gas that is generated by an inflator when a vehicle collides. An upper portion of an inflated portion of the webbing is located in a position in which each side of the head and the neck of the occupant can be protected with a shape that is proposed.

According to the above-mentioned configuration, as the upper portion of the inflated portion of the webbing that is diagonally arranged on the front of the occupant is located in a position in which each side of the head and the neck of the occupant can be protected with a particular shape, it is needless to say that the front of the occupant can be softly bound with the inflated portion in a head-on collision. The inflated portion enables the head and the neck of the occupant to be softly bound with the inflated portion in a side impact and the webbing of the passive safety device can also function as a side air bag system and an air curtain system.

Also, according to the present invention, a vehicular passive safety device includes a thickness wherein a portion to be inflated of the webbing that is inflated is proposed to become thinner from an upper portion to a lower portion based upon the configuration disclosed in the present invention.

According to the above-mentioned configuration, as the thickness when the portion to be inflated of the webbing is inflated becomes thinner from the upper portion to the lower part, the required capacity of the inflator can be reduced by thinning the lower portion of the portion to be inflated wherein a required binding force can easily be acquired even if the thickness is reduced, enabling secure binding of the head and the neck of the occupant with the upper portion of the inflated portion and reducing the volume.

Also, according to the present invention, a vehicular passive safety device according to the present invention includes portions of the two webbings to be inflated that are diagonally crossed on the front face of the front of an occupant based upon the configuration according to the present invention.

According to the above-mentioned configuration, as the portions of the two webbings to be inflated are diagonally crossed on the front face of the front of the occupant, the head and the neck of the occupant can be not only softly bound in a side impact from a right or left direction but the head can be securely bound in a head-on collision and the chin can be prevented from coming in contact with the front. In addition, as the portions of the two webbings to be inflated become thinner downwardly, the portions to be inflated can be smoothly crossed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described based upon embodiments of the invention shown in attached drawings below.

Figure 1:
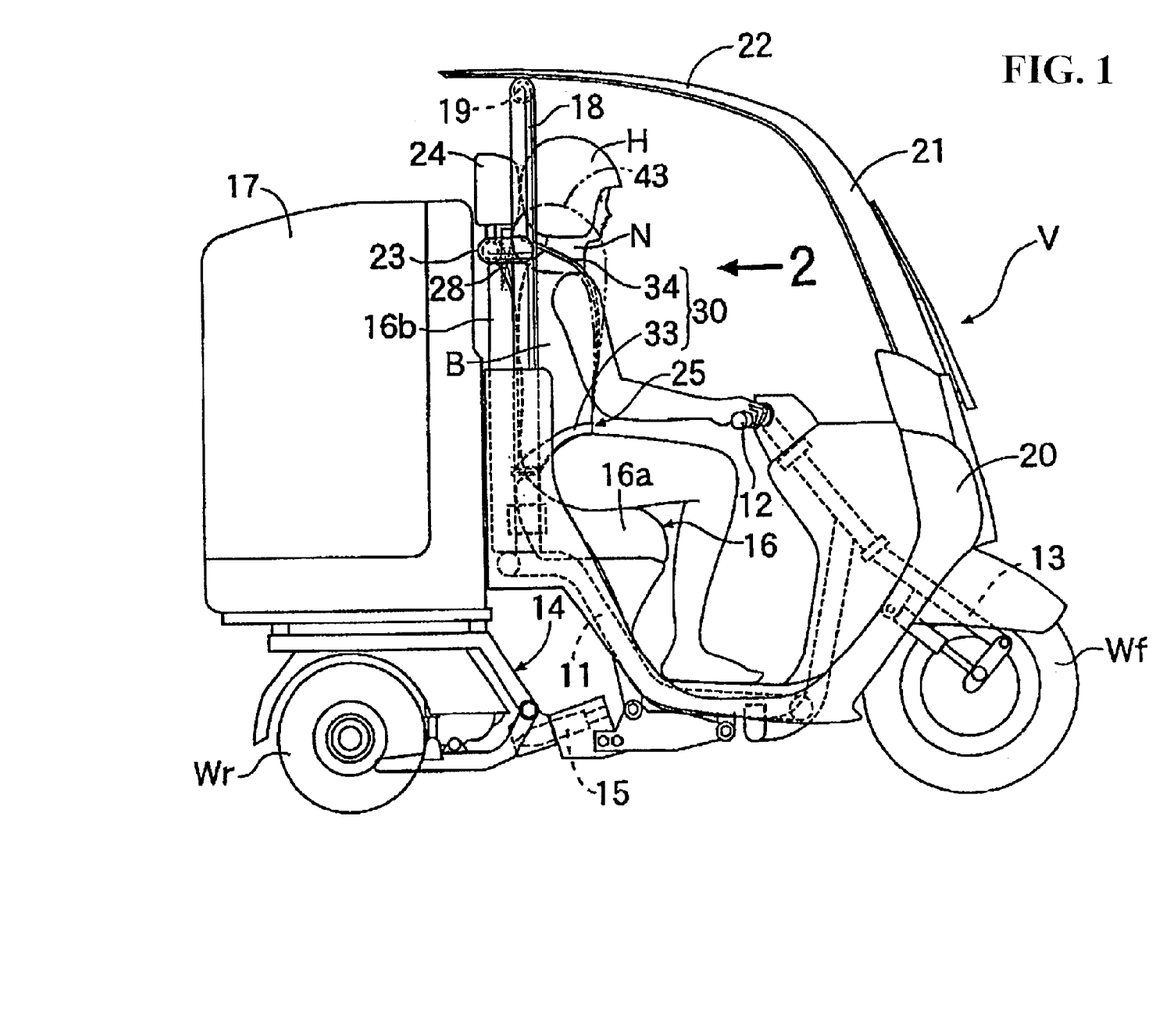
FIG. 1 is a general side view showing a three-wheeled vehicle.
Figure 2:
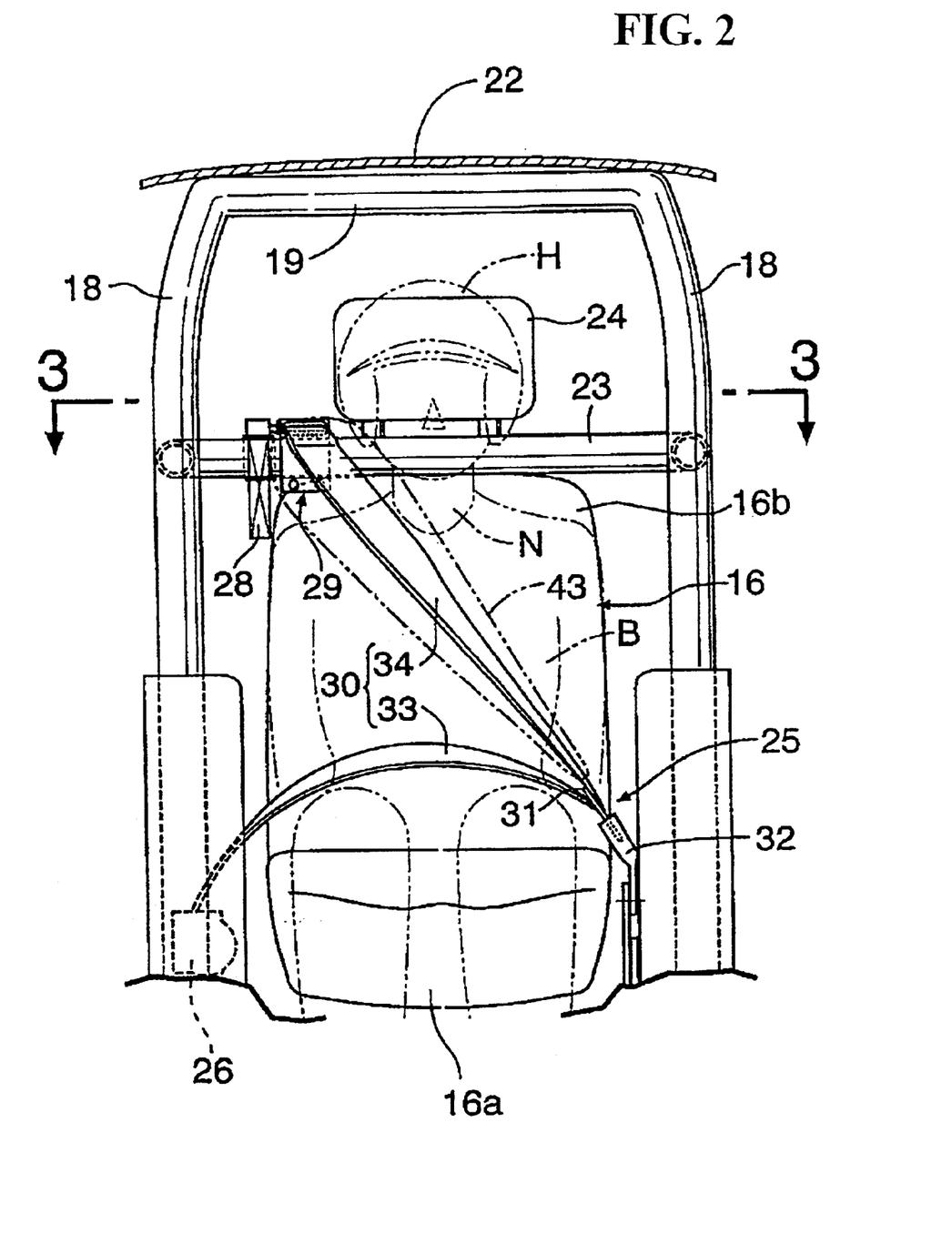
FIG. 2 is a view from a direction shown by an arrow 2 in FIG. 1.
Figure 3:
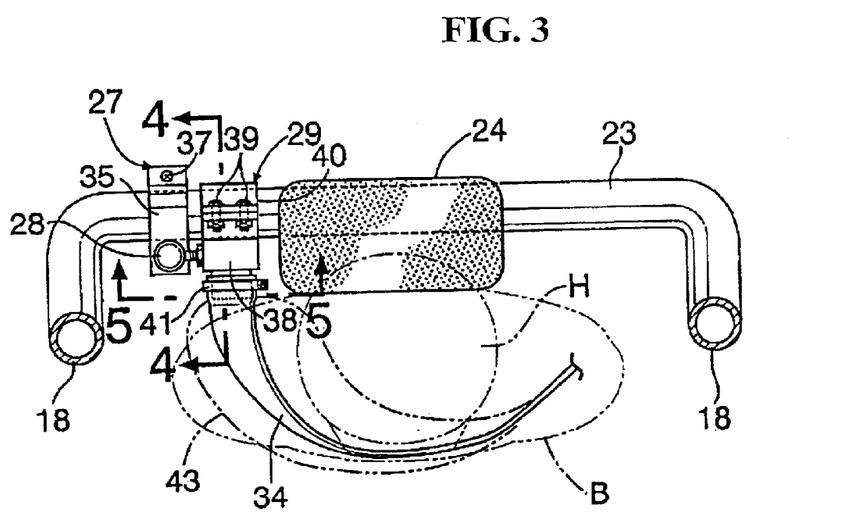
FIG. 3 is a view from a direction taken along the line 3—3 in FIG. 2.
Figure 4:
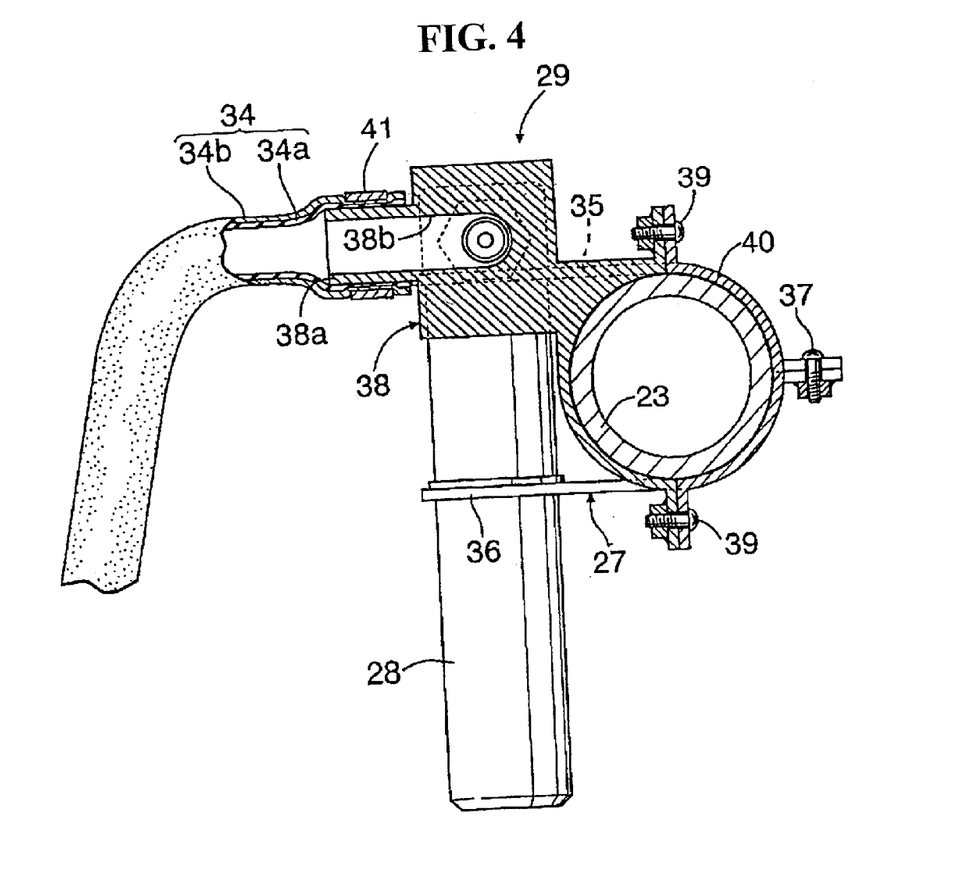
FIG. 4 is a sectional view from a direction taken along the line 4—4 in FIG. 3.
Figure 5:
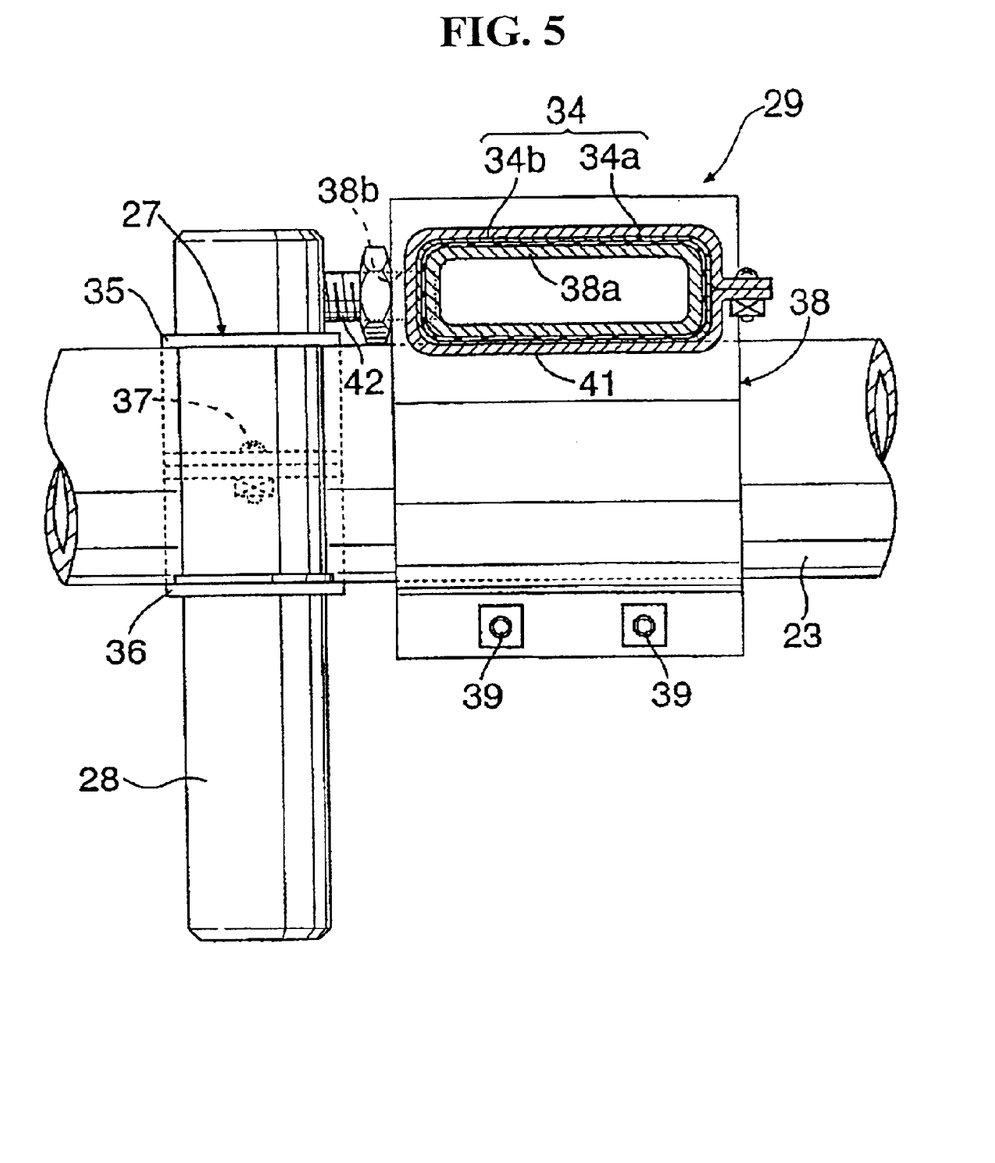
FIG. 5 is a view from a direction taken along the line 5—5 in FIG. 3.
Figure 6:
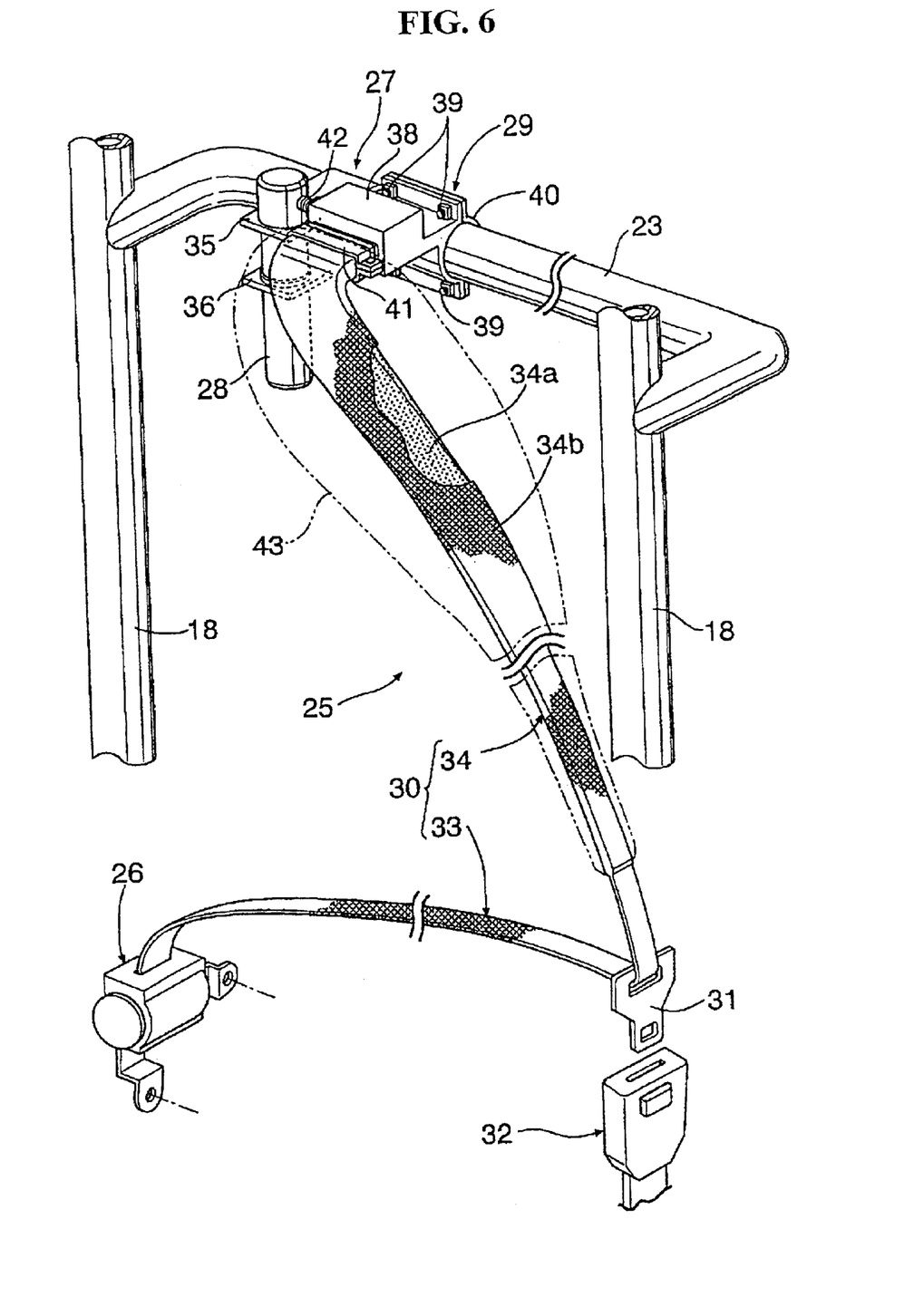
FIG. 6 is a general perspective view showing an air belt system.

As shown in FIGS. 1 and 2, the three-wheeled vehicle V is provided with one front wheel Wf arranged in the front of the vehicle body and a pair of right and left rear wheels Wr and Wr arranged in the rear of the vehicle body. The front wheel Wf is provided at the lower end of a fork 13 connected to a bar handle 12 supported by a body frame 11. The front wheel Wf can be steered right and left by the operation of the bar handle 12. A swing unit 14 with an engine and a transmission integrated relative thereto is supported in the rear of the body frame 11 via a pivot 15 so that the swing unit can be swung right and left. The rear wheels Wr and Wr are driving wheels that are mounted on the swing unit 14. A seat 16 for an occupant is provided over the body frame 11. A glove compartment 17 is supported on the swing unit 14 and is arranged at the back of the seat 16. Two struts 18 and 18 are provided on both sides of a seat back 16b. A roof supporter 19 is provided for connecting the respective upper ends of both struts 18 and 18 and the upper end of a leg shield 20 that are connected by a wind shield 21 and a roof 22. A headrest 24 for supporting the rear of the head of the occupant is provided to a cross member 23 for connecting respective intermediate portions of both struts 18 and 18.

As is clear by referring to FIGS. 3 to 6, an air belt system 25 for binding the occupant on the seat 16 is provided with a retractor 26 provided on the right side of a seat cushion 16a. An inflator 28 is provided that is mounted to an inflator mounting bracket 27 fixed in a position near to the right in the center of the cross member 23. Webbing 30 with an upper end connected to a webbing mounting bracket 29 is fixed to the cross member 23 on the left side of the inflator mounting bracket 27. The other end of the webbing 30 is wound by the retractor 26. A tongue 31 supports an intermediate portion of the webbing 30 so that the webbing can be slid relative thereto. A buckle 32 is provided on the left side of the seat cushion 16a to which the tongue 31 is connected so that the tongue can be detached.

The well-known retractor 26 winds the webbing 30 so that lower end can be pulled out, during normal operation when a mechanical acceleration sensor does not detect the acceleration of a predetermined value or more, the webbing 30 can be pulled out and the movement of the occupant's body is allowed. When the mechanical acceleration sensor detects the acceleration of the predetermined value or more at the time of the collision of vehicles, the webbing 30 is locked so that it cannot be pulled out and the occupant is bound by the webbing 30. The well-known inflator 28 is ignited when the acceleration sensor detects the acceleration of a predetermined value or more and generates high pressure gas by the combustion of propellant.

For the webbing 30, a lap belt 33 is positioned between the retractor 26 and the tongue 31 and a shoulder belt 34 is positioned between the tongue 31 and the inflator 28 that are integrated. The tongue 31 can be freely slid in the vicinity of a connection of the lap belt 33 and the shoulder belt 34 of the webbing 30. The lap belt 33 is formed by a plainly woven belt made of normal synthetic fiber and the shoulder belt 34 is composed of a folded bag 34a made of urethane rubber and silicone rubber and an elastic cover 34b covering the outside. A portion (a portion shown by a broken line in FIGS. 1 to 3 and FIG. 6) in which the inflatable bag 34a is housed in the shoulder belt 34 forms a portion 43 to be inflated.

The inflator mounting bracket 27 is provided with an upper supporting plate 35 fixed to the inflator 28 and a lower supporting plate 36 fitted to the periphery of the inflator 28 and fixed by a bolt 37 with the cross member 23 vertically between both supporting plates 35 and 36. The webbing mounting bracket 29 is provided with the body 38 of the bracket and a fixing member 40 fixed to the body 38 by four bolts 39 that are fixed with the cross member 23 in front and behind between the body 38 and the fixing member 40. The upper end of the shoulder belt 34 is fitted to a nozzle 38a protruded from the front face of the body 38 of the bracket and is firmly fixed by a fixing band 41. A high pressure gas supply pipe 42 extends from the upper end of the inflator 28 and is connected to the nozzle 38a via a high pressure gas passage 38b formed inside the body 38 of the bracket.

Next, the action of the embodiment of the present invention having the above-mentioned configuration will be described.

When the acceleration sensor detects the acceleration of a predetermined value or more caused by a collision of the vehicle, the inflator 28 is ignited, high pressure gas is created and when the high pressure gas is supplied from the high pressure gas supply pipe 42 to the bag 34a housed inside the shoulder belt 34 via the high pressure gas passage 38b and the nozzle 38a, the bag 34a is inflated together with the cover 34b by the pressure. As described above, as the contact area with the occupant is increased, compared with that of the shoulder belt 34 before inflation when the shoulder belt 34 of the webbing 30 is inflated, the occupant can be softly bound, compared with an ordinary seat belt system.

As shown by a chain line in FIGS. 1 to 3 and FIG. 6, the inflated portion 43 of the shoulder belt 34 diagonally extending along the front face of the front B of the occupant is the thickest in its upper portion and gradually becomes thinner downwardly from the upper portion. The thickest portion of the inflated portion 43 comes into contact with the right side of the head H and the neck N of the occupant. Therefore, the front B of the occupant which tries to move forward according to inertia in a head-on collision can be softly bound with an intermediate portion and a lower portion of the inflated portion 43, and the head H and the neck N of the occupant which try to move rightward according to inertia in a side impact can be softly bound with an upper portion of the inflated portion 43.

At this time, as the upper portion of the inflated portion 43 of the shoulder belt 34 is the thickest, the head H and the neck N of the occupant are securely bound and can be prevented from secondary collision with the strut 18. As the abdomen of the occupant is bound by a lap belt 33, a load from a low position of the front B received from the shoulder belt 34 is relatively small. However, the capacity of the inflator 28 can be reduced by thinning the lower portion that binds the low position of the front B of the inflated portion 43, thus, securing a necessary and sufficient binding force.

As the lap belt 33 and the shoulder belt 34 are integrated and are inserted into the tongue 31 so that they can be slid, they can be wound by one retractor 26 and the number of portions can be reduced as compared with two retractors that are provided to correspond to the lap belt 33 and the shoulder belt 34. As the upper end of the shoulder belt 34 is directly fixed to the webbing mounting bracket 29 and a slip guide for pulling out the shoulder belt 34 is not provided, the inflation of the shoulder belt 34 can be prevented from being delayed because the flow of high pressure gas from the inflator 28 is opposed by the slip guide.

Figure 7:
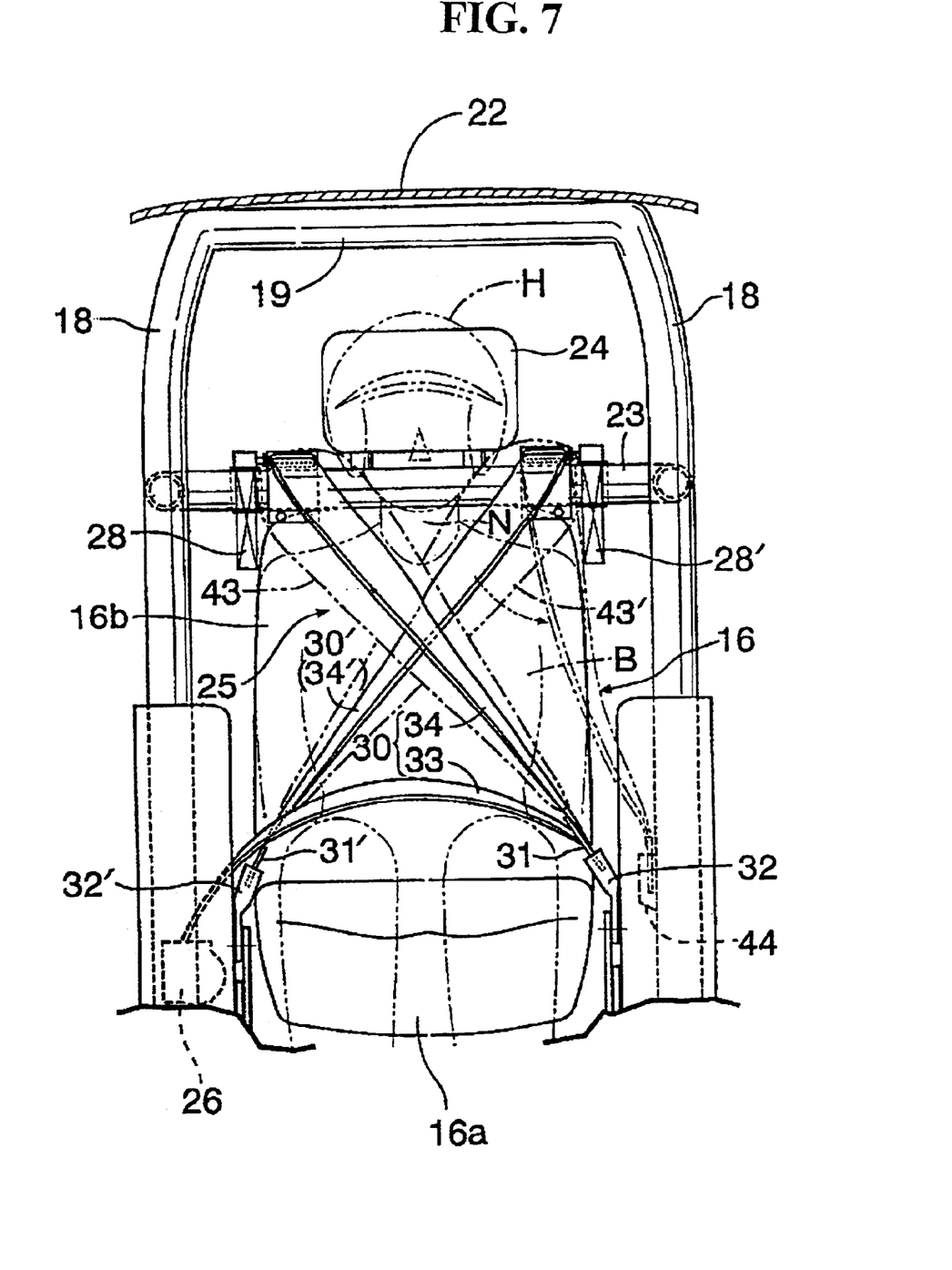
FIG. 7 is a view equivalent to a second embodiment of the invention and corresponding to FIG. 2.

Next, referring to FIG. 7, a second embodiment of the present invention will be described.

An air belt system 25 equivalent to a second embodiment is provided with second webbing 30' crossing the front B of an occupant in addition to the first webbing 30 of the air belt system 25 that is equivalent to the first embodiment. The second webbing 30' is formed by only a shoulder belt 34', that is provided with no lap belt and a tongue 31' provided at the lower end of the shoulder belt 34' that can be connected to a buckle 32' provided on the right side of a seat cushion 16a. The shoulder belt 34' of the second webbing 30' can be inflated with high pressure gas generated by an inflator 28' provided to a cross member 23. The shape of the inflated portion 43' of the shoulder belt 34' of the second webbing 30' and that of the first webbing 30 are bilaterally symmetrical with the inflated portion being the thickest in its upper portion corresponding to the left side of the head H and the neck N of the occupant and gradually becomes thinner downwardly from the upper portion.

As the second webbing 30' is provided with no retractor, a tongue housing box 44 for housing the tongue 31' when the second webbing is not used is provided on the left side of the seat cushion 16a.

According to the second embodiment, as the inflated portions 43 and 43' of the first and second webbings 30 and 30' are diagonally crossed on the front face of the front B of the occupant, the head H and the neck N of the occupant can be also softly bound in a side impact from a right or left direction. In addition, the chin of the occupant is placed between a pair of inflated portions 43 and 43' in a head-on collision and can be prevented from coming into contact with the front B. As a pair of inflated portions 43 and 43' become thinner downwardly, the inflated portions 43 and 43' can be smoothly crossed on the front face of the front B.

The embodiments of the invention have been described above in detail, however, the design of the invention may be changed in a range which does not deviate from the objects of the invention.

For example, in the embodiments, a three-wheeled vehicle V is described, however, the present invention can also be applied to a two-wheeled vehicle and/or a four-wheeled vehicle.

As described above, according to the present invention, as the upper portion of the inflated portion of the webbing is diagonally arranged on the front of the occupant and is located in a position in which each side of the head and the neck of the occupant can be protected and has a shape, it is needless to say that the front of the occupant can be softly bound with the inflated portion in a head-on collision. The head and the neck of the occupant can be softly bound with the inflated portion in a side impact and the webbing of the passive safety device can also function as a side air bag system and an air curtain system.

Also, according to the present invention, as the thickness of the portion of the webbing to be inflated becomes thinner from the upper portion to the lower portion, the required capacity of the inflator can be reduced by thinning the lower portion of the inflated portion in which is required for a binding force to be easily acquired even if the lower portion is thinned. The reduced volume of the inflated part enables a secure binding of the head and the neck of the occupant with the upper portion of the inflated portion.

Also, according to the present invention, as the inflated portions of the two webbings are diagonally crossed on the front face of the occupant, the head and the neck of the occupant can be not only softly bound in a side impact from a right or left direction but the head can be securely bound in a head-on collision and the chin can be prevented from coming into contact with the front. In addition, as the two inflated portions become thinner downwardly, they can be smoothly crossed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular passive safety device for inflating a portion of a webbing diagonally arranged to be in front (B) of an occupant so as to bind the occupant on a seat with a high pressure gas generated by an inflator when a vehicle collides comprising:

an upper portion of the webbing to be inflated is located in a position wherein a side of a head (H) and a neck (N) of an occupant can be protected, wherein the inflator is mounted on a cross member adjacent to the upper portion of the webbing to be inflated, the cross member being a tubular member connecting to struts on both sides of the seat.

2. The vehicular passive safety device according to claim 1, wherein the thickness when the portion of the webbing to be inflated is inflated becomes thinner from the upper portion to a lower part.

3. The vehicular passive safety device according to claim 2, wherein the portions to be inflated of two webbings are diagonally crossed to be arranged in front (B) of an occupant.

4. The vehicular passive safety device according to claim 1, wherein the webbing includes a folded bag constructed of urethane rubber and silicone rubber with an elastic cover disposed therearound.

5. The vehicular passive safety device according to claim 1, and further including an inflator bracket for mounting the inflator and a web mounting bracket, said web mounting bracket includes a body for mating with an upper end of the webbing to enable high pressure gas to be in communication with said webbing for inflating the same.

6. The vehicular passive safety device according to claim 5, wherein the portion of the webbing being disposed directly adjacent to a head and neck of an occupant inflates to a greater degree relative to a portion of the webbing displaced downwardly for ensuring protection to a head and a neck of an occupant during a collision.

7. The vehicular passive safety device according to claim 5, and further including a nozzle protruding from said body for mating with the upper end of the webbing for supplying high pressure gas directly into an interior portion of said webbing.

8. The vehicular passive safety device according to claim 3, wherein the two webbings are bilaterally symmetrical with the inflated portion being thickest at an upper end of the webbing for protecting a head and a neck of an occupant.

9. A vehicular passive safety device comprising:

a webbing adapted for restraining a passenger relative to a vehicle, said webbing including a portion adapted to be selectively inflated with a gas generated by an inflator based on a predetermined condition; and an upper portion of the webbing to be inflated being located adjacent to a side of a head (H) and a neck (N) of an occupant for protecting a head (H) and a neck (N) upon the occurrence of said predetermined condition, wherein the inflator is mounted on a forward side of a cross member and is rigidly connected by a high pressure gas pipe to the upper portion of the webbing to be inflated, the upper portion of the webbing being inward of the inflator.

10. The vehicular passive safety device according to claim 9, wherein the thickness when the portion of the webbing to be inflated is inflated becomes thinner from the upper portion to a lower part.

11. The vehicular passive safety device according to claim 10, wherein the portions to be inflated of two webbings are diagonally crossed to be arranged in front (B) of an occupant.

12. The vehicular passive safety device according to claim 9, wherein the webbing includes a folded bag constructed of urethane rubber and silicone rubber with an elastic cover disposed therearound.

13. The vehicular passive safety device according to claim 9, and further including an inflator bracket for mounting the inflator and a web mounting bracket, said web mounting bracket includes a body for mating with an upper end of the webbing to enable gas to be in communication with said webbing for inflating the same.

14. The vehicular passive safety device according to claim 13, wherein the portion of the webbing being disposed directly adjacent to a head and neck of an occupant inflates to a greater degree relative to a portion of the webbing displaced downwardly for ensuring protection to a head and a neck of an occupant during a collision.

15. The vehicular passive safety device according to claim 13, and further including a nozzle protruding from said body for mating with the upper end of the webbing for supplying gas directly into an interior portion of said webbing.

16. The vehicular passive safety device according to claim 11, wherein the two webbings are bilaterally symmetrical with the inflated portion being thickest at an upper end of the webbing for protecting a head and a neck of an occupant.

17. The vehicular passive safety device according to claim 1, wherein the inflator has a tubular structure, and is mounted on the cross member in a position outward of the webbing.

18. The vehicular passive safety device according to claim 2, wherein the inflator has a tubular structure, and is mounted on the cross member in a position outward of the webbing.

* * * * *